United States Patent [19]

Jacobsen et al.

[11] Patent Number: 4,922,164

[45] Date of Patent: May 1, 1990

[54] ECCENTRIC MOTION MOTOR

[75] Inventors: Stephen C. Jacobsen; John E. Wood; Richard H. Price, all of Salt Lake City, Utah

[73] Assignee: Sarcos Group, Salt Lake City, Utah

[21] Appl. No.: 251,774

[22] Filed: Oct. 3, 1988

[51] Int. Cl.⁵ .......................................... H02N 1/00
[52] U.S. Cl. ...................................... 310/309; 310/308
[58] Field of Search .................... 310/80, 82, 83, 308, 310/309; 464/102, 52

[56] References Cited

U.S. PATENT DOCUMENTS

| | | | |
|---|---|---|---|
| 735,621 | 8/1903 | Thomsau | 310/308 |
| 1,370,864 | 3/1921 | Welffens | 464/102 |
| 2,378,669 | 6/1945 | Vickers | 310/82 |
| 2,561,890 | 7/1951 | Stoddard | 310/67 R |
| 3,297,888 | 1/1967 | Zwolski | 310/309 |
| 3,517,225 | 6/1970 | Klein | 310/309 |
| 3,558,944 | 11/1984 | Verge | 310/83 |
| 3,614,481 | 10/1971 | Halliday | 310/309 |
| 3,629,624 | 12/1971 | Staudfe | 310/309 |
| 4,061,043 | 12/1977 | Stiles | 310/309 |
| 4,225,801 | 9/1980 | Packer, Jr. | 310/309 |
| 4,482,828 | 11/1984 | Vergues | 310/80 |
| 4,575,356 | 3/1986 | Murohushi et al. | 464/52 |
| 4,642,504 | 2/1987 | Jacobsen | 310/309 |
| 4,728,837 | 3/1988 | Bhadra | 310/80 |

FOREIGN PATENT DOCUMENTS 1132229 6/1962 Fed. Rep. of Germany .
159716 1/1933 Switzerland .
766053 1/1957 United Kingdom ................. 310/309

OTHER PUBLICATIONS

Linear-Motion Electric Machines, Laithwaite, E. R. et al., Proceedings of the IEEE, vol. 58, No. 4, Apr., 1970, pp. 531–542.
Principle of an Electrostatic Linear Actuator, Fujita, Hiroyuki, Transducers '87, p. 861–864, Jun., 1987.
Fujita, H. and Omodaka, A.; "Electrostatic Actuators for Micromechtronics", IEEE, Microrobot and Teleoperators Workshop, Hyannis, Mass., Nov. 9–11, 1987.

Primary Examiner—Patrick R. Salce
Assistant Examiner—Judson H. Jones
Attorney, Agent, or Firm—Thorpe, North & Western

[57] ABSTRACT

An eccentric motion motor includes a hollow cylindrical stator in which is positioned a cylindrical armature in rolling engagement with the stator. Elongate conductive strips are disposed in the inside wall of the hollow of the stator to extend substantially the length thereof, with the strips being circumferentially spaced about the stator hollow. The conductive strips are coupled to a commutator voltage source which applies a voltage to successive ones of the conductive strips to produce an electrostatic force which attracts the armature and causes it to roll in the hollow of the stator. The armature may be made either of a conductive material or a dielectric material.

45 Claims, 3 Drawing Sheets

ECCENTRIC MOTION MOTOR

BACKGROUND OF THE INVENTION

This invention relates to a motor which operates with a rolling, non-sliding action between an armature and a stator.

Electric motors typically include a fixed stator and a rotatable armature, between which electromagnetic forces are produced to cause the armature to rotate. The armature is mounted or carried by bearings to maintain a certain spacing between the armature and the stator and this, of course, gives rise to friction. Also, the further the spacing between the armature and stator, the weaker are the electromagnetic forces.

Electrostatic motors likewise generally include a stator and armature mounted to rotate near or within the stator, where the forces of attraction therebetween are electrostatic rather than electromagnetic. Again, friction and weaker forces between the armature and stator because of spacing are disadvantages of such a structure. Examples of electrostatic motors are shown in U.S. Pat. Nos. 735,621, 3,297,888, 3,517,225 and 4,225,801.

A machine or device called an electrostatic linear actuator is disclosed in Fujita, H. and Omodaka, A., "Electrostatic Actuators for Micromechatronics", IEEE, Microrobot and Teleoperators Workshop, Hyannis, Mass., Nov. 9-11, 1987. This device consists of a plane wafer with striped electrodes spaced apart in an insulation layer overlying the top of the wafer. A cylindrical electrode/roller is positioned on top of the insulation layer to roll back and forth as successive ones of the striped electrodes are activated or charged (and then discharged). Various alternative arrangements of electrostatic linear actuators are described in the reference, but in each arrangement, the electrode/roller rolls back and forth, stopping and starting at each end of the insulation layer.

Several proposals have been made for a type of machine in which an armature or roller rolls inside a cylindrical cavity as a result of electromagnetic forces being successively produced about the perimeter of the cavity. See, for example, U.S. Pat. Nos. 2,561,890, 4,728,837 and 4,482,828, German Patent No. DAS 1132229, and Swiss Patent No. 159,716. Disadvantages of the use of electromagnetic forces, which the devices in all of these references do, are that the devices are generally quite bulky and not easily miniaturized, and only limited types of materials are available for use as device components, e.g. armatures, and these materials are generally quite heavy, making the entire device heavy.

SUMMARY OF THE INVENTION

It is an object of the invention to provide an electroattractive motor in which the electrical gap spacing between the stator and armature may be minimized in order to maximize the forces of attraction and hence the torque and power that such a motor can produce.

It is also an object of the invention to provide such a motor in which electrostatic forces of attraction can best be utilized to cause the armature to move.

It is a further object of the invention to provide such a motor in which the armature moves over a curved, closed pathway on the stator, with no abrupt stops and starts being required.

It is an additional object of the invention to provide such a motor which is simple in design and especially suited for the use of small scale components.

It is another object of the invention to provide such a motor in which gear reduction is intrinsically achieved with the motor kinematics.

It is still another object of the invention to provide such a motor in which sliding friction of motor parts is substantially eliminated.

The above and other objects of the invention are realized in a specific illustrative embodiment of an eccentric-motion motor which includes a stator defining a continuous closed surface pathway, an armature composed of an electroattractable material and disposed on the closed surface pathway to maintain rolling, non-sliding contact with the pathway, and a series of electroattractive elements disposed in the stator at the closed surface thereof where the elements may be successively energized to attract and cause the armature to roll along the pathway. A circuit is provided for successively energizing the electroattractive elements to thus cause the armature to roll. A coupling mechanism couples the rotation of the armature to a utilization device where the mechanical power output of the motor may be put to use.

In accordance with one aspect of the invention, the electroattractive elements comprise electrical conductors disposed in the stator at spaced-apart locations along the pathway for successively receiving electrical charges. The energizing circuit is coupled to the conductors to successively supply electrical charges thereto to create an electrostatic force of attraction between the conductors and the armature which is made of either an electrically conductive material or a dielectric material.

In accordance with another aspect of the invention, a sensing circuit is provided to sense the location of the armature and cause the energizing circuit to supply electrical charges to the electrical conductors located a predetermined distance in front of the armature in the direction the armature is rolling.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
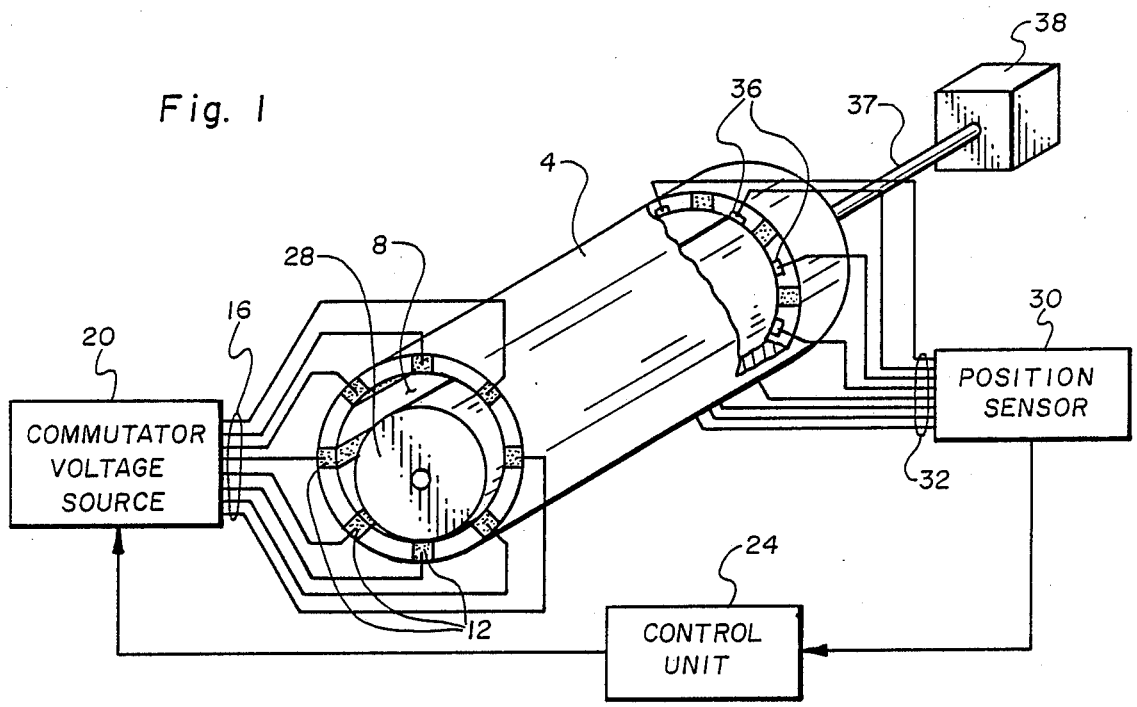
FIG. 1 is a perspective, partially cut-away view of an eccentric motion motor made in accordance with the principles of the present invention.

Referring to FIG. 1, there is shown a casing or housing 4 having a generally cylindrical interior hollow or cavity 8. This housing 4 comprises the stator of the eccentric motion motor of the figure. Spaced about and disposed in the interior wall of the stator 4 are a plurality of conductor strips 12 which extend the length of the stator. The conductor strips 12 are coupled by way of conductor wires 16 to a commutator voltage source 20 which, in response to signals from a control unit 24, supplies electric charges (voltage) to the conductor strips in succession, either in the counterclockwise or clockwise direction. That is, a charge (voltage), either negative or positive, is supplied to one or several conductor strips and then withdrawn as a charge (voltage) is then supplied to the next one or several of the conductor strips in circumferential succession within the stator so that the location of the charged conductor strips circulates about the interior of the stator.

Disposed in the interior of the stator 4 is an elongate, generally cylindrical body 28 which serves as the armature of the motor. The armature 28 preferably is made of a dielectric material having a high dielectric constant, e.g. greater than five. Alternatively, the armature 28 could be made of an electrically conductive material.

A position sensor circuit 30 is coupled by conductors 32 to sensing elements 36 spaced circumferentially about the hollow 8 in the stator 4. These sensing elements might illustratively be field effect transistor devices which receive a current from the position sensor circuit 30 and whose current flow therethrough varies depending upon the position of the armature 28 and the known prescribed applied voltage. In this manner, position sensor circuit 30 can determine the location of the armature 28 within the stator 4.

The position sensor circuit 30 signals the control unit 24 identifying the position of the armature and the control unit 24 in turn signals the commutator voltage source 20 to supply charges (voltage) to the next conductor strip or strips in front of the armature in the direction in which the armature is rolling. That is, when the armature 28 is detected as reaching a certain location with respect to a certain strip or strips within the stator 4, the commutator voltage source 20 is signalled to supply a charge (voltage) to such conductor strip or strips. It should be understood that different voltages could be applied to different ones of the strips simultaneously to increase the torque, for example.

As the conductor strips 12 are successively charged, an electric field is developed by those strips to attract mobile charges in the armature 28 to the surface nearest the charge conductive strip (if the armature 28 is made of a conductive material), or to induce a polarization in the armature (if the armature is made of a dielectric material). An electroattractive force is thus produced between the charged conductor strip(s) and the armature (either induced charges or induced polarization) and this force causes the armature to roll within the stator 4 toward the charged conductor strip(s). As the armature 28 approaches the charged conductor strip(s), the next conductor strip(s) in succession would be charged and the just previous charged conductor strip(s) would be discharged (by the commutator voltage source 20) to further cause the armature 28 to roll in the direction of the next charged conductor strip(s). In this manner, the armature 28 is caused to roll about the hollow 8 of the stator 4.

Because the armature 28 is in rolling contact with the walls of the hollow 8 of the stator 4, the armature and conductor strips are in close proximity so that the electrostatic forces developed therebetween are quite strong. Also, less friction results from the armature movement because it is in rolling contact with the stator and is not supported by bearings. Further, gear reduction is intrinsically achieved without requiring special gearing. The amount of reduction is defined by the formula $W_r = ((R_s/R_a) - 1) W_c$, where $W_r$ is the rotation rate of the armature 28, $W_c$ is the rate at which the conductor strips 12 are charged (commutation rate) provided the armature "keeps up", $R_s$ is the radius of the hollow 8 of the stator, and $R_a$ is the radius of the armature.

The armature 28 is coupled by a flexible coupling mechanism (shaft) 37 to a utilization unit 38 which is driven by the rotation of the armature and in this manner the energy of the motor of FIG. 1 is harnessed and used. The construction of coupling mechanisms will be discussed later.

The control unit 24 might illustratively be a microprocessor or other stored program control unit currently available on the market such as DEC VAX-LAB or IBM PC. The commutator voltage source 20 might illustratively be a motor driven rotary switch including a wiper element caused to rotate and successively engage stationary contacts each of which is coupled to a different one of the conductors 16. The wiper element would be connected to a voltage source which is thus successively connected to the conductor strips 12 as the wiper element successively engages the stationary contacts of the rotary switch. Alternately, the commutator voltage source 20 could be a conventional electronic commutator capable of energizing a strip or multiple strips simultaneously.

The conductor strips 12 might illustratively comprise copper, aluminum, or metal alloys deposited or layed down in the stator 4, which itself could be constructed of glass, silicon, ceramics, epoxies, etc. See the aforecited Fujita et al reference.

The position sensor 30 might illustratively be a current source for supplying current to each of the sensing elements 36 and a current detector or bank of detector's for determining the current level, i.e., the magnitude of the current being conducted by each of the sensing elements, and then a signalling circuit for signalling the control unit 24 in a manner to identify which sensing element 36 the armature 12 is closest to.

Alternative armature position sensing arrangements might include a capacitive sensing approach in which the conductor strips 12 are monitored for current flow, thus providing an indication of the capacitance around the perimeter of the stator 4 which, in turn, is determined by the location of the armature 28. Brief pulses of charges or current would be supplied to the conductive strips 12 by the position sensor 30 in short periods during which the driving voltage, supplied by the driving contact 20, is turned off. This pulsed current would be monitored to ascertain the position of the armature 28.

Still another arrangement for determining the position of the armature 20 could include an optical sensing arrangement in which the interior of the stator 4 would be illuminated; then, light passing through openings positioned circumferentially about the stator 4 would be monitored to determine the position of the armature 28. Obviously, when the armature were in a position to cover certain of the openings, no light would pass therethrough thereby identifying the location of the armature.

Figure 2A:
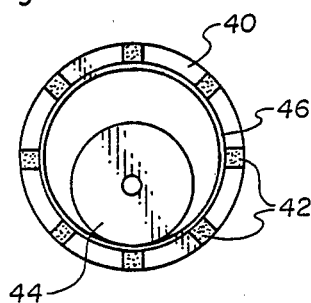
FIG. 2A shows a front view of the stator and armature of FIG. 1, with an insulating coating overlying the inside surface of the stator.

FIG. 2A shows a graphic, front view of a hollow cylindrical stator 40 with conductor strips 42 and an armature 44. If the armature 44 is made of a conductive material, as opposed to dielectric material, then an insulator layer 46 is disposed about the interior side wall of the stator 40 to cover the conductor strips 42 and prevent electrical contact between the strips and the armature 44. The purpose of this, of course, is to prevent the flow of current from the conductor strips 42 to the armature 44.

Figure 2B:
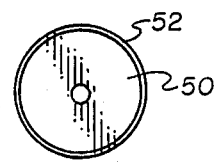
FIG. 2B shows a front view of the armature of FIG. 1 with an insulating coating overlying the exterior surface of the armature.

FIG. 2B shows a graphic, front view of a cylindrical armature 50 on the outer surface of which is disposed an insulator layer 52. This would be an alternative arrangement to that shown in FIG. 2A to prevent electrical contact between a conductive material armature and the conductor strips. The insulator layer 46 (FIG. 2A) or 52 (FIG. 2B) might illustratively comprise polyamide, silicon dioxide, aluminum oxide, fluorinated hydrocarbon polymers, etc.

Figure 3:
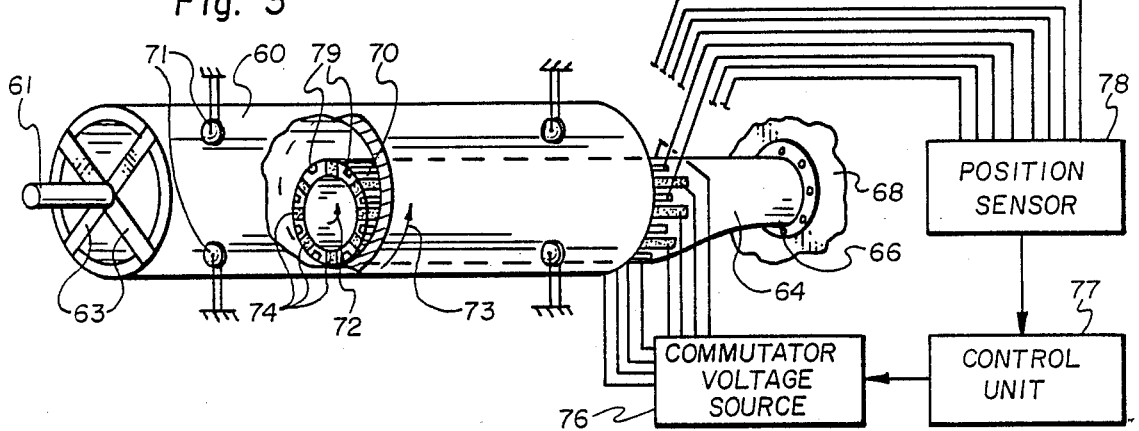
FIG. 3 shows a perspective, partially cut-away view of an alternative embodiment of an eccentric motion motor made in accordance with the principles of the present invention.

FIG. 3 shows a perspective, partially cut-away view of another embodiment of the present invention in which the stator is positioned within the hollow of a hollow armature. In particular, an elongate hollow tube 60, which serves as the armature, is positioned about an elongate stator arm 64 which is fixed at least at one end 66 to some type of support 68. (The stator arm 64 could be fixed at both ends, with the armature 60 positioned about the middle of the stator arm.) In one arrangement, the stator 64 is constructed to be laterally flexible but substantially rotationally rigid. That is, the stator 64 is constructed to allow movement of the free end 70 of the stator in a circular motion such as indicated by arrow 72. Such construction might comprise a hollow or solid cylindrical piece of beryllium copper, a quartz fiber, a tightly-coiled helical spring (one which may not be compressed), or Bion (registered trademark) made by Lord Corporation. In another arrangement, the stator 64 is constructed to be substantially rigid, in which case relative movement between the stator arm and the armature is a result solely of movement by the armature.

Positioned circumferentially about the outer surface of the stator 64 are a plurality of conductor strips 74. These conductor strips are similar to those shown in FIG. 1 except that they are positioned on the exterior surface of a cylindrically shaped stator 70. The conductor strips 74 are coupled to a commutator voltage source 76 which successively supplies voltage to the conductor strips 74. As this occurs, the conductor strips on the stator 64 are successively attracted to the hollow armature 60 which is made either of a dielectric material or a conductive material. As the stator 64 is attracted toward the side walls of the armature 60 it is caused to move in a circular motion, such as a counterclockwise motion as indicated in FIG. 3, to contact and thus cause the armature 60 to likewise move in the same direction, as indicated by the arrow 73 of FIG. 3.

With a flexible stator arm 64, the armature 60 of FIG. 3 could either be mounted to rotate about its cylindrical axis on bearings 71 as shown in FIG. 3, where the cylindrical axis of the armature coincides with the center axis of the fixed end 66 of the stator 64, or left free to rotate about a non-fixed axis. In the first case, the armature 60 simply rotates about its cylindrical axis as the stator 64 is supplied with voltage by the voltage source 76. In the second case, the armature 60 is not mounted at all, but rather simply is left free to move and rotate about a non-fixed axis as the stator 64 is energized. For narrow but long stators and armatures, the armatures could be made to rotate within at least certain confines, for example, within a cavity, and the mechanical motion thus produced could be utilized to drive utilization mechanisms.

With a rigid stator arm 64, the armature 60 rotates about the stator in a hula hoop type action, as the stator is energized.

The embodiment of FIG. 3, just as the embodiment of FIG. 1, includes a control unit 77, a position sensor 78 coupled to sensing elements 79 located on the stator 64, and a utilization unit coupling shaft 61 mounted to the armature 60 by braces 63.

Figure 4:
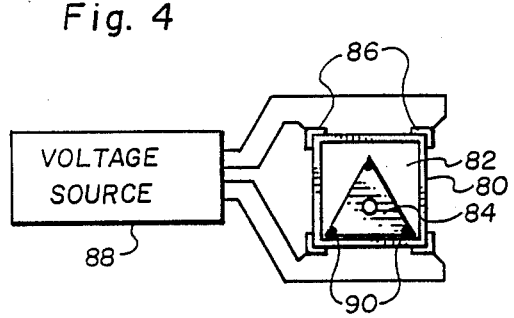
FIG. 4 shows a graphic, front view of an eccentric motion motor having a stator and armature with polygonal cross sections.
Figure 5:
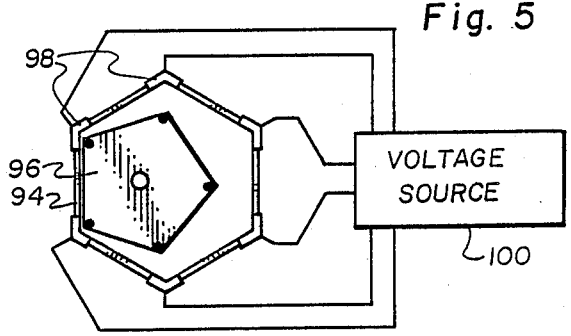
FIG. 5 is another embodiment of an eccentric motion motor in which the armature and stator have polygonal cross sections.
Figure 6:
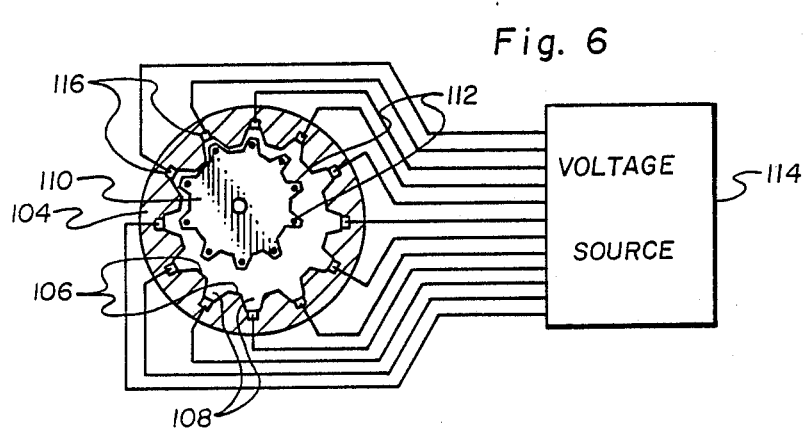
FIG. 6 shows a graphic, front view of an eccentric motion motor having a stator and armature formed with a gear track and gear teeth respectively.

FIGS. 4, 5 and 6 show front views of some alternative shapes and constructions for the stator and armature of the motor of the present invention. FIG. 4 shows a stator 80 having a square cross section with a hollow 82 in which is disposed an armature 84 having a triangular cross section. Disposed at the corners of the stator 80 are conductor strips 86 which extend the length of the stator (although not so shown in FIG. 4). (The conductor strips could also be disposed at the sides.) A voltage source 86 successively supplies voltage to the conductor strips 88 to cause the armature to eccentrically rotate in a step-wise fashion within the stator. For example, the next conductor strip to be energized in the FIG. 4 drawing would either be the upper right or upper left hand strip which would cause the armature 84 to rotate either clockwise or counterclockwise respectively. The markings 90 are provided simply to indicate the locations at which charge density would tend to be strongest (if the armature 84 were made of conductive material) or at which polarization would be most intense (if the armature were made of a dielectric material), or at which electrets were located (if the armature included electrets).

FIG. 5 shows still another embodiment of a hollow stator 94 formed in a hexagonal shape, an armature 96 formed in a pentagonal shape, conductor strips 98 and a voltage source 100. In the FIG. 5 embodiment, the armature 96 would eccentrically rotate again in a step-wise fashion similar to the arrangement of FIG. 4.

FIG. 6 shows still another embodiment of a hollow stator 104 whose interior side wall is formed with a series of splines 106 and grooves 108 formed to extend longitudinally in the stator 104 and spaced circumferentially on the side wall. An armature 110 is disposed in the hollow of the stator and includes gear teeth 112 which extend longitudinally along the armature and are spaced circumferentially thereabout, with the teeth being dimensioned to fit into the grooves 108 and allow the splines 106 to be received in the spaces between the teeth. A voltage source 114 successively supplies voltages to conductor strips 116 which extend along the bottom of the grooves 108. The armature 110 is attracted in the same fashion as in the other embodiments so that it rolls in an eccentric fashion about the side wall of the stator 104. Provision of the splines and grooves of the stator and gear teeth of the armature serve to eliminate slippage between the armature and stator as the armature rolls.

Figure 7:
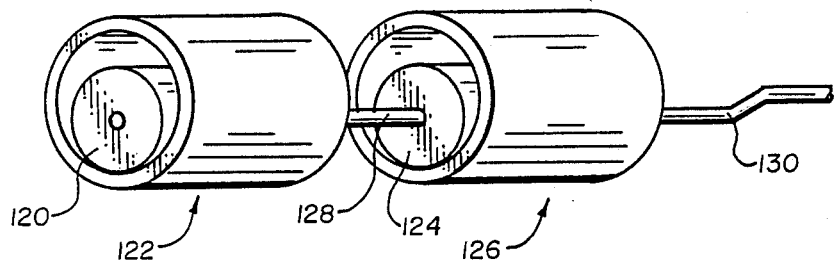
FIG. 7 shows a perspective view of two eccentric motors of the present invention coupled in a series relationship.

FIG. 7 shows two eccentric motors coupled in a series relationship in which armatures 120 and 124 of motors 122 and 126 respectively are coupled at their longitudinal, cylindrical axis by a shaft 128. Armature 124 includes a coupling shaft 130 which extends out the end of the armature opposite that at which the shaft 128 is located. The conductor strips and other circuitry are not shown in FIG. 7 but would be provided in the same fashion as shown in FIG. 1. The motors 122 and 126 are similar to the motor of FIG. 1 and by connecting the motors together in a series relationship, the power output produced on the coupling shaft 130 is increased.

Figure 8:
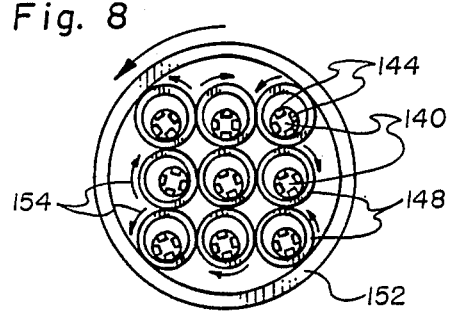
FIG. 8 shows a front view of a plurality of eccentric motion motors arranged in a parallel relationship.

FIG. 8 shows a type of parallel arrangement of eccentric motion motors with each individual motor being similar to that shown in FIG. 3. In particular, a three-by-three array of motors is shown with each motor including a stator arm 140 having conductor strips 144, and a hollow armature housing 148. One end of each of the stator arms 140 would be held in a fixed position, as shown in FIG. 3, with the other end extending into a corresponding one of the armature housings 148. The armature housings 148 touch adjacent housings as shown in the drawing, with the four corner armature housings of the array being in contact with an outer, hollow, cylindrical drive casing 152. The direction of rotation of the armature housings 148 are shown by the arrows 154, and as can be seen, the four housings on the corners of the three-by-three array all rotate in the same direction (counterclockwise in FIG. 8) to, in turn, cause the outside casing 152 to rotate in that direction. The power output of the arrangement of FIG. 8 would be taken from the outer casing 152 by coupling it in a conventional manner to a utilization unit. Other circuitry suitable for supplying voltages to the conductor strips 144 would be similar to that shown in FIG. 1 except that multiple stator conductor strips would be energized simultaneously, with the conductor strips of adjacent stators being energized in opposite circular directions. Mountings using conventional bearing structure would be provided for the armature housings 148 and outer casing 152.

Figure 9:
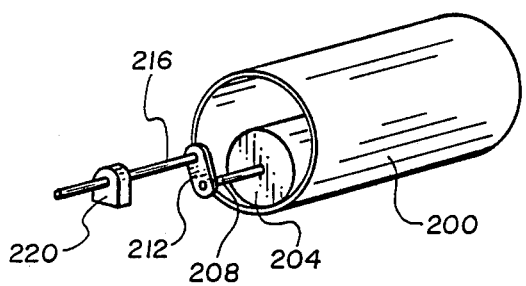
FIG. 9 shows a perspective view of an eccentric motion motor having a crank coupling mechanism coupled to the armature.

FIGS. 9 through 12 show various arrangements for coupling armatures of the motors of the present invention to utilization mechanisms. FIG. 9 shows a perspective view of a hollow stator housing 200 in which is positioned an armature 204. An axle 208 is coupled at one end to the armature 204 to be in line with the cylindrical axis of the armature, and at the other end to a laterally extending arm 212. The arm 212 is also coupled to an axle 216 which is rotatably mounted in a support 220 to be in line with the cylindrical axis of the hollow of the stator 200. The axle 208 is either rotatably mounted in the armature 204 or in the arm 212. As the armature 204 is caused to roll within the stator 200, it causes the arm 212 to rotate, thus rotating axle 216 which would be connected to a utilization mechanism. The speed of rotation of the axle 216 is equal to the commutation speed, i.e., the speed at which the axis of the armature 204 moves (in a circle) in the stator 200 (provided the armature "keeps up" with energization of the conductor strips). This coupling arrangement is essentially a conventional crank configuration.

Figure 10:
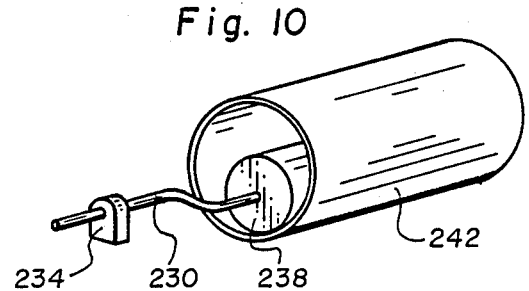
FIG. 10 shows a perspective view of an eccentric motion motor having a flexible coupling mechanism coupled to the armature.

FIG. 10 shows a coupling arrangement which includes a laterally flexible axle 230 rotatably mounted in a support 234, and to an armature 238 disposed in a stator 242. The axle 230 is fixed to the armature 238 so as to rotate when the armature rotates. The axle 230, advantageously, is made of beryllium copper, etc., so as to flex laterally but not rotationally. The axle 230 would be coupled to a utilization unit as described earlier.

The rotation speed of the axle 230 of FIG. 10 equals the rolling speed of the armature 238, not the commutation speed as in FIG. 8. This rolling speed is greater than the commutation speed if the radius of the armature is less than one-half the radius of the stator hollow.

Figure 11:
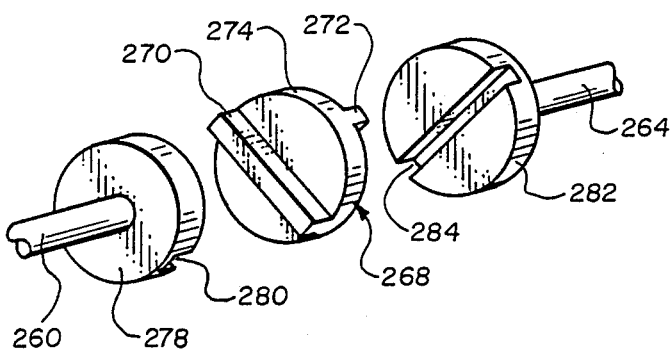
FIG. 11 shows a perspective, fragmented view of a so-called Oldham type coupler useful for coupling an eccentric-motion armature with an off-line shaft of a utilization mechanism.

FIG. 11 shows an exploded view of a so-called Oldham type coupler for coupling together an axle 260 whose axis is offset from another axle 264. This is made possible because of intermediate element 268 which includes perpendicularly positioned splines 270 and 272 disposed on opposite sides of a disc 274. The axle 260 is coupled to a disc 278 having a groove 280 for receiving the spline 270, and the axle 264 is likewise joined to a disc 282 having a groove 284 for receiving the spline 272. The middle element 268 of the coupler slides with respect to both the discs 278 and 282 as necessary to allow one axle, such as axle 260, to drive the other axle, such as axle 264. Use of this type coupler with the present invention would involve coupling one of the axles to the armature of a motor and the other axle to a utilization mechanism.

Figure 12:
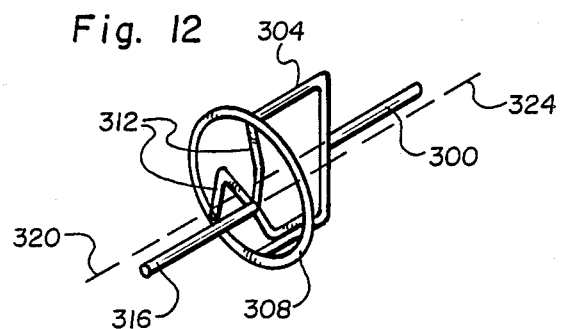
FIG. 12 shows a perspective, fragmented view of another coupling mechanism for use with the present invention.

FIG. 12 shows another embodiment of a coupler which could be used with the present invention. This coupler includes an axle 300 coupled by way of a bracket 304 to a ring 308. Flexible and bent spokes 312 are joined at one of the rims to the inside periphery of the ring 308 and at their other ends to one end of an axle 316. The axle 300, for example, would be coupled to the armature of a motor of the present invention whereas the axle 316 would be coupled to a utilization mechanism. Because the bent spokes 312 are flexible, the axes of the axles 300 and 316 may be offset (as indicated by dotted lines 320 and 324) and yet rotation of one of the axles will cause rotation of the other axle about those axes. The spokes 312 might illustratively be made of silicon and joined to the ring 308 which could be made of a substantially rigid plastic, metal, etc.

In the manner described above, a simple, efficient and easy to manufacture electroattractive motor is provided. The gap between the armature and stator of the motor is minimized in order to maximize the forces of attraction developed therebetween to thus maximize the torque and power that such a motor can produce. The armature rolls over the stator along a closed pathway with no abrupt changes of momentum being required. The motor construction of the present invention is especially suited to small scale components where electrostatic forces can best be utilized. Gear reduction is intrinsically achieved with the kinematics of the motor of the present invention so that no external gear reduction apparatus is required.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. An eccentric-motion motor for driving a utilization mechanism comprising
   a stator defining a continuous closed surface pathway,
   an armature composed at least in part of an electroattractable material and rollably disposed on the closed surface pathway, said armature having an exterior surface which maintains contact with the pathway as the armature rolls,
   a series of electroattractive elements disposed in the stator at the closed surface, said elements being successively energizable to attract and cause the armature to roll along the closed surface pathway,
   means for successively energizing the electroattractive elements, and
   means for coupling the armature to the utilization mechanism.

2. A motor as in claim 1 wherein said electroattractive elements comprise electrical conductors disposed in the stator at spaced-apart locations along the pathway for successively receiving electrical charges, and wherein said energizing means comprises commutator means for successively supplying electrical charges to said electrical conductors.

3. A motor as in claim 2 wherein at least the outside portion of said armature is made of electrically conductive material, coated with a film of non-conductive material to prevent contact between the electrical conductors and the conductive material of the armature.

4. A motor as in claim 2 wherein at least the outside portion of said armature is made of electrically conductive material, and wherein said stator further comprises electrical insulator material disposed over said electrical conductors to prevent contact between the armature and the conductors.

5. A motor as in claim 2 wherein said armature is made of a dielectric material.

6. A motor as in claim 2 wherein said armature includes electrets having a net charge of one polarity.

7. A motor as in claim 2 wherein said electrical conductors comprise strips of conductive material arranged to be generally parallel with one another and perpendicular to the direction of the pathway.

8. A motor as in claim 1 wherein said stator comprises a casing having a hollow with a generally concave sidewall, said continuous closed surface pathway coinciding with the sidewall of the hollow, and wherein said armature comprises a body having a generally convex outer surface.

9. A motor as in claim 8 wherein the cross-sectional dimension of the armature is marginally smaller than the cross-sectional dimension of the hollow of the stator.

10. A motor as in claim 9 wherein the cross-sections of the hollow and the body are generally circular.

11. A motor as in claim 9 wherein the cross-sections of the hollow and the body are generally oval.

12. A motor as in claim 1 wherein said stator comprises a casing having a hollow with a polygonal cross-section, and wherein said armature comprises a body having a polygonal cross-section with the same number of sides or less than that of the hollow and with smaller dimensions.

13. A motor as in claim 12 wherein said hollow has a polygonal cross-section with n sides, and wherein said armature has a polygonal cross-section with n−1 sides.

14. A motor as in claim 12 wherein the electroattractive elements are disposed at the corners of the hollow.

15. A motor as in claim 12 wherein the electroattractive elements are disposed at the sides of the hollow.

16. A motor as in claim 1 wherein said stator comprises a casing having a hollow whose sidewalls is formed with undulations arranged generally parallel to one another and perpendicular to the direction of the pathway, and wherein said armature comprises a body having a generally convex exterior surface with undulations formed to mesh with the undulations of the sidewall of the hollow as the armature rolls.

17. A motor as in claim 16 wherein said undulations of the sidewall of the hollow comprises alternating splines and grooves extending perpendicularly to the direction of the pathway, and wherein said undulations on the exterior surface of the body comprise gear teeth formed to mesh with the splines and grooves of the hollow as the armature rolls.

18. A motor as in claim 1 wherein said stator comprises a casing having a cavity with a generally circular cross-section, and wherein said armature comprises a body having a generally circular cross-section, smaller in dimension than the cross-section of the cavity.

19. A motor as in claim 18 wherein the diameter of the armature is marginally smaller than the diameter of the cavity.

20. A motor as in claim 1 further comprising a second stator, a second armature, a second series of electroattractive elements disposed in the second stator, and a second means for successively energizing the second series of electroattractive elements, all arranged together in substantially the same manner as the corresponding elements of claim 1, and wherein said second armature is coupled axially to the first-mentioned armature to roll in unison with the first-mentioned armature in a series relationship.

21. A motor as in claim 1 wherein said coupling means comprises an elongate arm, one end of which is coupled to the armature to be generally parallel with the axis of rotation of the armature, and the other end of which is coupled to the utilization mechanism, wherein said arm is substantially rotationally nonflexible and laterally flexible.

22. A motor as in claim 18 wherein said coupling means comprises a crank means having a pair of generally parallel axles offset from one another, and a connecting arm connecting the two axles together in the offset condition, where one of the axles is coupled to the armature at a location generally coincident with the axis of rotation of the armature, and the other axle is coupled to the utilization mechanism such that as the armature rolls and thus rotates said one axle, the other axle is caused to rotate about its own longitudinal axis.

23. A motor as in claim 1 wherein said coupling means comprises a generally rigid annulus, a first axle coupled to the armature at a location generally coincident with the axis of rotation of the armature, a bracket joining the annulus to the first axle, a second axle coupled to the utilization mechanism, and three or more flexible spokes, each formed with a bend near its longitudinal center and each joined at one end to the annulus at a location spaced from the locations at which the other spokes are joined to the annulus, and joined at the other end to the second axle so that as the armature rolls and thus rotates the first axle, the second axle is caused to rotate about its own longitudinal axis.

24. A motor as in claim 1 wherein said coupling means comprises an Oldham type coupler.

25. A motor as in claim 1 wherein said means for energizing comprises means responsive to an armature location signal for energizing the electroattractive elements when the armature is a predetermined distance from the elements in the direction in which the armature is rolling, said motor further comprising sensing means for determining the location of the armature on the stator pathway and for supplying a location signal to the means for energizing to cause it to energize the electroattractive elements when the armature is said predetermined distance therefrom.

26. An eccentric motion motor comprising
a stator arm fixed at least at one end,
a plurality of electroattractive elements disposed at spaced-apart locations peripherally about the stator arm at its outer surface,
an armature body having a hollow, said body being disposed about the stator arm so that the stator arm extends into the hollow adjacent to and in contact with the wall of the hollow,
said armature being made at least in part of an electroattractable material, and
means for successively energizing the electroattractive elements to produce an attractive force between the elements and the armature to cause relative movement between the stator arm and the armature and thereby cause the armature to rotate.

27. A motor as in claim 26 wherein said electroattractive elements comprise conductive electrodes for successively receiving voltages, and wherein said energizing means comprises commutator means for successively supplying voltages to said conductive electrodes.

28. A motor as in claim 27 wherein at least that portion of said armature surrounding the hollow is made of electrically conductive material, said armature including a layer of non-conductive material overlying the wall of the hollow.

29. A motor as in claim 27 wherein at least that portion of said armature surrounding the hollow is made of electrically conductive material, said motor further including a layer of non-conductive material overlying the conductive electrodes.

30. A motor as in claim 27 wherein said armature is made of a dielectric material.

31. A motor as in claim 27 wherein said armature includes electrets having a net charge of one polarity.

32. A motor as in claim 26 wherein said stator arm is generally laterally flexible and rotationally inflexible, wherein the hollow of the body is generally cylindrical, wherein said body is mounted to rotate about the hollow's cylindrical axis which is in line with a fixed end of the stator arm, and wherein the attractive force between the electroattractive elements and the armature causes the stator arm to circulate inside the hollow in a confined pathway and thereby cause the armature to rotate.

33. A motor as in claim 32 further comprising additional stator arms, each fixed at least at one end and arranged with the first-mentioned stator arm in an $n_1$ by $n_2$ rectangular array, where $n_1$ and $n_2$ are odd numbers,
additional pluralities of electroattractive elements, each plurality disposed at spaced apart locations peripherally about a different one of the additional stator arms,
additional armature bodies, each having generally cylindrical hollows and each disposed over a different one of the additional stator arms, said additional armature bodies being made of an electroattractable material,
a hollow cylindrical casing disposed to circumscribe the stator bodies and contact some of the bodies positioned on the corners of the $n_1$ by $n_2$ array,
means for successively energizing the electroattractive elements of each of the stator arms to produce attractive forces between the elements and the corresponding armatures to cause the stator arms to move generally in circles inside their respective armature bodies and thereby cause the armatures to rotate in the same direction as the movement of the respective stators, with each armature rotating in the opposite direction from that in which the adjacent armatures rotate.

34. A motor as in claim 26 wherein the sidewall of the armature is generally concave, and wherein the stator arm comprises a generally laterally flexible and rotationally inflexible elongate body having a generally convex outer surface, so that the stator arm is caused to circulate inside the hollow of the body in a confined pathway.

35. A motor as in claim 34 wherein the cross-sectional dimension of the stator arm is marginally smaller than the cross-sectional dimension of the hollow of the armature.

36. A motor as in claim 35 wherein the cross-sections of the hollow and the stator arm are generally circular.

37. A motor as in claim 35 where the cross-sections of the hollow and the stator arm are generally oval.

38. A motor as in claim 26 wherein said armature hollow has a polygonal cross-section, and wherein said stator arm has a polygonal cross-section with the same number of sides or less than that of the hollow and with smaller dimensions.

39. A motor as in claim 26 wherein the sidewall of the armature hollow is formed with undulations arranged generally parallel to one another and perpendicular to the direction of the pathway, and wherein said stator arm comprises an elongate body having a generally convex exterior surface with undulations formed to mesh with the undulations of the sidewall of the hollow as the stator arm circulates.

40. A motor as in claim 39 wherein said undulations of the sidewall of the hollow comprise alternating splines and grooves extending perpendicularly to the direction of the pathway, and wherein said undulations on the exterior surface of the stator arm comprise gear teeth formed to mesh with the splines and grooves of the hollow as the stator arm circulates.

41. A motor as in claim 26 wherein said stator arm is substantially fixed so that the attractive force between the electroattractive elements and the armature causes the armature to rotate eccentrically about the stator arm.

42. A motor as in claim 26 wherein said means for energizing comprises means responsive to an armature location signal for energizing the electroattractive elements when the location of armature contact with the stator arm is a predetermined distance from the elements in the direction in which the armature is moving, said motor further comprising sensing means for determining the location of armature contact with the stator arm and for supplying a location signal to the means for energizing to cause it to energize the electroattractive elements when the location of armature contact is said predetermined distance therefrom.

43. A motor as in claim 26 further comprising means for coupling the armature to a utilization mechanism.

44. A motor as in claim 26 wherein said armature is constrained to rotate about a fixed axis.

45. A motor as in claim 26 wherein said stator arm is laterally flexible and is fixed at both ends.

* * * * *